[11] 3,576,357

[72] Inventor Kenneth Levy
Binghamton, N.Y.
[21] Appl. No. 819,031
[22] Filed Apr. 24, 1969
[45] Patented Apr. 27, 1971
[73] Assignee Singer-General Precision, Inc.
Binghamton, N.Y.

[54] ENVELOPE EXPANSION OPTICS FOR VISUAL SYSTEMS WITH PERSPECTIVE ALTERATION MEANS
9 Claims, 8 Drawing Figs.

[52] U.S. Cl. .................................................... 350/181, 350/190
[51] Int. Cl. .................................................... G02b 13/08
[50] Field of Search .......................................... 350/181, 190

[56] References Cited
UNITED STATES PATENTS
2,975,670   3/1961   Hemstreet ..................... 350/181X
3,015,988   1/1962   Hemstreet ..................... 350/190X Attorneys—Francis L. Masselle, William Grobman and Andrew G. Pullos ABSTRACT: The disclosed embodiment of the present invention is an optical system which, when employed with a visual system which alters the apparent perspective of an image, increases the limits of the visual system along a horizontal axis perpendicular to the recorded flight path. The optical system is formed of a pair of anamorphic lens groups, each positioned at respective opposite ends of the visual system to operate on the light rays entering and leaving the visual system. The lens group at the object end of the visual system increases the ratio of height to width of the image being transformed by a predetermined factor. The lens group at the image end of the visual system decreases the ratio of height to width of the image being transformed by the same factor. As a result, all lines which are other than entirely vertical or horizontal are tilted through a greater angle.

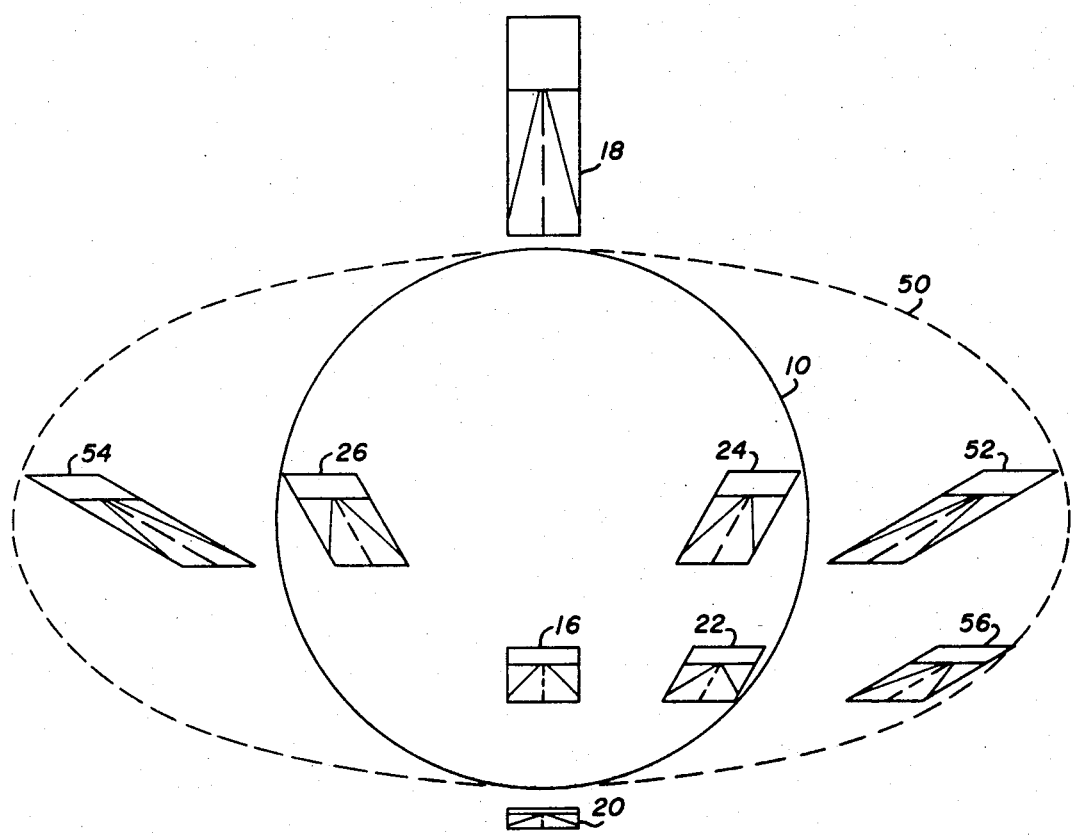
Fig_2
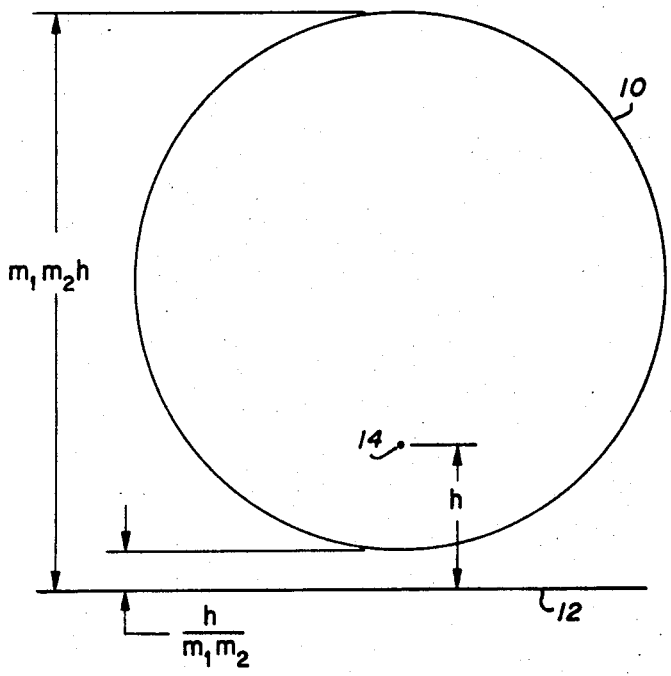
Fig_1
INVENTOR.
KENNETH LEVY
BY
HIS ATTORNEY

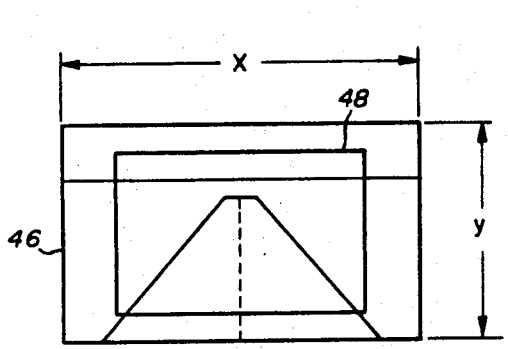
Fig_4a
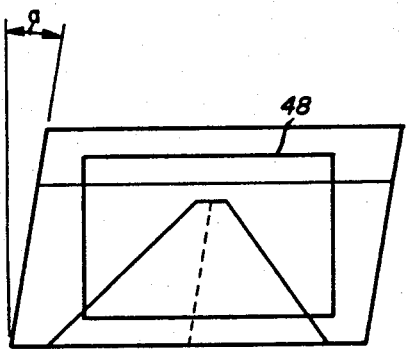
Fig_4b
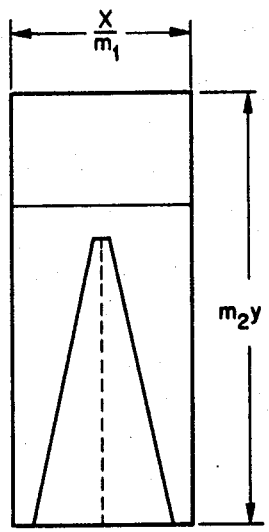
Fig_4c
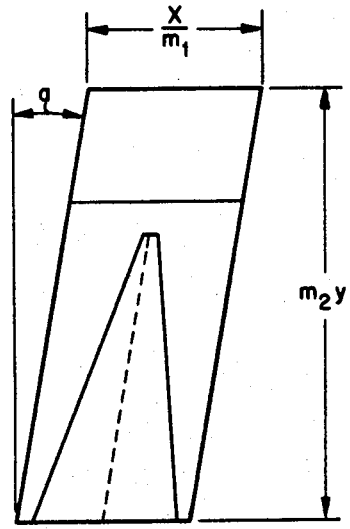
Fig_4d
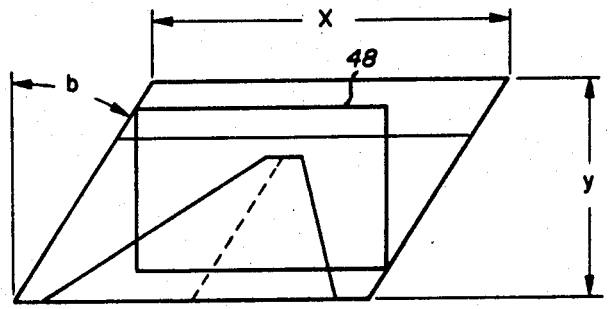
Fig_4e
INVENTOR.
KENNETH LEVY

ENVELOPE EXPANSION OPTICS FOR VISUAL SYSTEMS WITH PERSPECTIVE ALTERATION MEANS

This invention relates generally to a visual system for a vehicle simulator and more particularly to an optical system which, when employed with a visual system which alters the apparent perspective of an image, increases the lateral change of the apparent perspective by a predetermined factor. The present invention has particular application in combination with a visual system which employs a motion picture film containing scenes recorded along a typical vehicular path.

Visual systems which employ a motion picture film containing scenes recorded along a typical vehicular path and distortion optics for altering the apparent perspective of the images of those scenes are well known in the art. One such visual system is disclosed in U.S. Pat. No. 3,015,988. As described in that patent, a scene recorded on a motion picture film is projected through an optical system which is capable of altering the apparent perspective of the displayed image within confined limits which define an envelope of the visual system. The envelope of such a visual system is determined by the parameters of the optical elements which are employed for distorting the image. Another limiting factor on the envelope of the visual system is the size of the film frame. However, if the size of the film frame is sufficiently large, the limits of the visual system will be determined only by the parameters of the optical elements which distort the image.

In the known visual systems which alter the apparent perspective of an image, the limits of the visual system can be increased by altering the parameters of the optical elements. In many of the known visual systems, the relationship of horizontal to vertical deviation is fixed by the parameters of the optical elements. Consequently, if the parameters of the optical elements are changed to produce a greater deviation in one direction, the permissible deviation in the other direction is also increased.

In the visual system described in the aforementioned patent, the image is transformed to alter the apparent perspective thereof by performing two primitive transformations, a spherical magnification, and a rotation of the image. The spherical magnification is employed for removing or cancelling any spherical magnification produced by the combined effects of the two primitive transformations on the image. The counter rotation of the image is employed for removing or cancelling any rotation of the image as it is being transformed by the two primitive transformation means. Consequently, the relationship of the permissible vertical to horizontal deviation of such a visual system is defined by the parameters of the primitive transformation elements. In particular, the magnification of the primitive transformation elements defines the envelope of the visual system.

Within this specification and the claims appended hereto, the term "primitive transformation" is employed to mean a unidimensional transformation, with all dimensions along the axis of transformation being multiplied by a factor representing the "power" or "magnification" of the transformation, and with all dimensions normal to the axis of transformation remaining unchanged. The term "primitive transformation" is defined and explained in rigorous mathematical form on page 31, volume II of "Differential and Integral Calculus" by R. Courant, 1936, Nordeman Publishing Co., Inc., New York, N.Y.

The envelope of the visual system disclosed in the aforementioned patent approximates a circle which is in a plane perpendicular to the recorded flight path. Consequently, if the parameters of such a visual system are changed to provide a greater lateral or horizontal deviation from the recorded flight path, the permissible vertical deviation increases correspondingly. In order to increase the limits of such a visual system, therefore, it is necessary to increase the magnification of the primitive transformation elements in the optical system. As is well know, an optical element having an excessively large magnification requires a considerable number of corrective optical elements. Consequently, light transmission is reduced and the resolution of the system is decreased.

In practice, when a visual system is constructed, the parameters of the optical system are selected to provide the maximum permissible excursion while maintaining a reasonable design configuration. That is, a trade off exists between the maximum permissible deviation capability of the visual system and the practical design considerations. As a result, the parameters of an existing visual system cannot be altered without sacrificing certain design considerations and performance capabilities.

In the visual system disclosed in the aforementioned patent, the primitive transformations must be effected at various angular orientations with respect to the object and image in accordance with the desired visual deviation to be achieved. Consequently, the primitive transformation elements are mounted for rotation about the optical axis of the visual system. If the magnification of those primitive transformation elements is increased in order to increase the envelope of the visual system, additional optical elements must be incorporated into the system to correct the optical aberrations which would result from such an increase. Accordingly, the additional elements must also be rotated about the optical axis in synchronism with the primitive transformation elements.

As previously mentioned, the envelope of the visual system disclosed in the aforementioned patent can be expanded by increasing the magnification of the primitive transformation elements. An increase of the magnification of the primitive transformation elements, however, results in an increased spherical magnification within portions of the envelope. The maximum spherical magnification which will result is equal to the product of the magnifications of the primitive transformation elements. The spherical magnification element in the visual system must be capable of cancelling the maximum spherical magnification which will result from the transformations caused by the primitive transformation elements. Consequently, the spherical magnification element must have an extremely large range. In the visual system disclosed by the aforementioned patent, the spherical magnification element must have a range of magnifications equal to the product of the two primitive transformation elements.

Accordingly, the present invention provides an optical system which, when employed with a visual system which alters the apparent perspective of an image, increases the maximum permissible lateral deviation of the apparent perspective without sacrificing any of the design consideration or performance characteristics of the visual system. Since the maximum permissible deviation in altitude of existing visual systems is sufficient for a large majority of the missions to be simulated, the optical system of the present invention increases the permissible lateral deviation without affecting the permissible vertical deviation of the visual system.

It is, therefore, an object of the present invention to provide an optical system which can be employed with an existing visual system to increase the permissible lateral deviation of the apparent perspective of the displayed image.

Another object of the present invention is to provide an optical system which can be employed with a visual system to increase the permissible lateral deviation of that visual system and which employs optical elements which remain fixed.

Still another object of the present invention is to provide an optical system which can be employed with a visual system which alters the apparent perspective of an image to increase the permissible lateral deviation of the apparent perspective and which requires no moving parts or elements.

Yet another object of the present invention is to provide an optical system which, when employed with a visual system which alters the apparent perspective of an image, does not require an extended spherical magnification range over that provided by the visual system.

A feature of the present invention resides in the provision of a pair of primitive transformation elements each positioned at respective opposite ends of a visual system to operate on the light rays entering and leaving the visual system, with the transformation element at the object end of the visual system operating to increase the ratio of height to width of an image being transformed by a predetermined factor and with the transformation element at the image end of the visual system operating to decrease the ratio of height to width of the image being transformed by the same factor.

An advantage of the present invention is that the magnification of the various elements within the visual system employed therewith need not be altered to achieve an increase in the lateral deviation limits of that visual system. Another advantage is that the elements of the optical system of the present invention remain fixed, therefore, requiring no drive system for movement thereof. Still another advantage of the optical system of the present invention is that it may be employed with an existing visual system in order to increase the lateral deviation limits thereof.

These and other objects, features and advantages of the present invention will be more fully realized and understood from the following detailed description when taken in conjunction with the accompanying drawings wherein:

FIG. 1 is a view of a portion of the envelope of a known visual system, such as that disclosed in U.S. Pat. No. 3,015,988;

FIG. 2 is a geometrical diagram and diagrammatic view illustrating a comparison between the envelope of a known visual system and the envelope as modified by the use of the principles of the present invention;

FIGS. 4a—e are geometrical diagrams useful in understanding the manner in which the transformations performed by the invention combine to effect a desired perspective alteration in an image.

Figure 3:
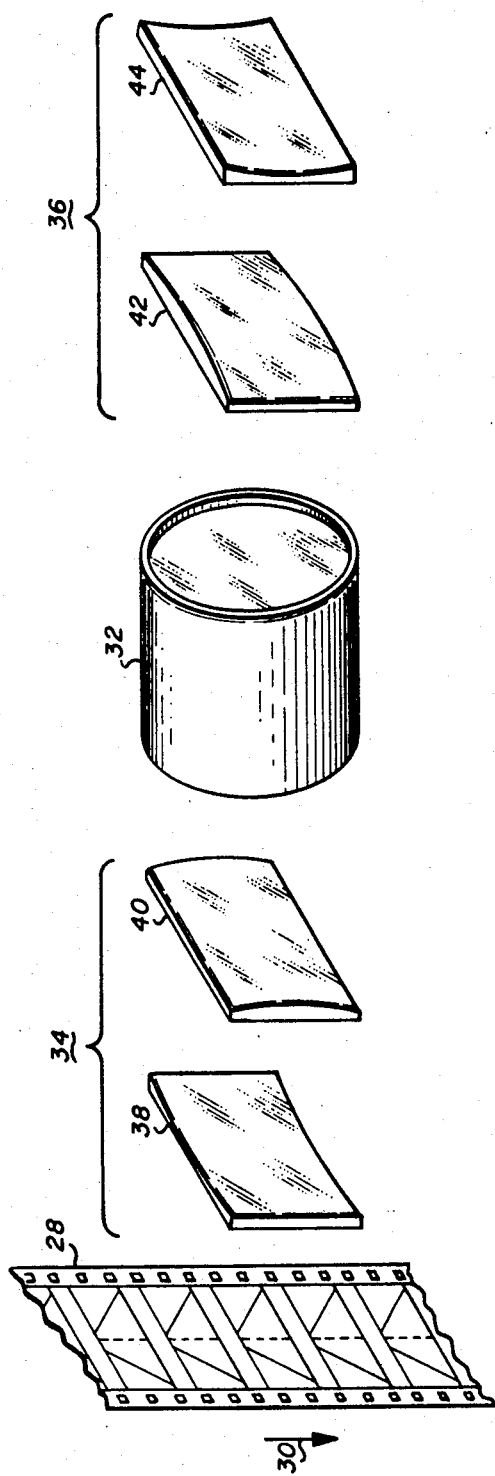
FIG. 3 is a perspective view diagrammatically illustrating one embodiment of the present invention.

With reference to FIG. 1, there is shown the outline of an envelope 10 of a visual system known in the prior art, such as the visual system disclosed in U.S. Pat. No. 3,015,988. In particular, the envelope 10 illustrated in FIG. 4 of that patent. Ground level is represented by a line which is designated with the reference numeral 12 and the recorded flight path, which is perpendicular to the plane of the paper, is represented by a dot which is designated with the reference numeral 14.

As shown in FIG. 1, the shape of the envelope 10 approximates a circle having a diameter and a position with respect to ground level determined by the power of each of the primitive transformation elements ($m_1$, $m_2$) which are employed in the visual system. Accordingly, if it is desired to increase the size of the envelope 10, the powers of the primitive transformation elements must be increased.

FIG. 2 diagrammatically illustrates the distortion produced in an image to effect a visual excursion within the envelope 10. A scene recorded on the flight path 14 is represented by a rectangle 16. If it is desired to produce an apparent altitude change of the perspective point of the undistorted image from the recorded scene, the image is expanded for an increase in altitude as represented by the rectangle 18 and is compressed for a decrease in altitude as represented by the rectangle 20. If a simulated visual excursion is made laterally from the recorded flight path, the image of the recorded scene is sheared while maintaining all horizontal lines horizontal and without varying the spacing between the horizontal lines. Such a sheared image is represented by the parallelogram 22. At all other points around the periphery of the envelope 10, a combination of shearing and vertical compression or expansion is performed on the image. The maximum lateral excursion is obtained at the two diametrically opposite points on the envelope 10 spaced laterally from the center of the envelope. The images produced at such points are represented by the parallelograms 24 and 26.

As previously mentioned, if it is desired to increase the size of the envelope 10, it is necessary to increase the magnification of the primitive transformation elements within the visual system. Since a trade off exists between the magnification of the primitive transformation elements and a number of other designed considerations, the envelope 10 can be expanded to a predetermined limit and any further expansion thereof would be undesirable. Consequently, if the magnification of the primitive transformation elements is selected to provide the largest envelope possible while maintaining other design considerations within desired specifications, further expansion of the envelope 10 by alteration of the parameters of the optical elements within the visual system is not possible. Accordingly, the present invention provides an optical system which can be employed with the visual system disclosed in the aforementioned patent and other visual systems which are effective to alter the apparent perspective of an image and which permits a greater lateral visual excursion of the displayed imagery.

One preferred embodiment of the present invention is illustrated in FIG. 3 of the drawings. As shown therein, a strip of motion picture film 28 contains a plurality of scenes recorded along a typical vehicular path. The film 28 is driven in an intermittent fashion in a direction represented by the arrow 30. Each successive frame of the film 28 is illuminated by an illumination source (not shown) and the resultant image is transmitted through distortion optics 32 to a screen (not shown) for display to a student pilot. The distortion optics 32 comprises any of the known visual systems for altering the apparent perspective of an image.

The optical system of the present invention comprises a first group of optical elements 34 interposed between the film 28 and the distortion optics 32 and a second group of optical elements 36 disposed between the distortion optics 32 and the screen. The lens group 34 operates on the image to alter the height to width ratio thereof by predetermined factor and the lens group 36 further operates on the image to alter the height to width ratio by the same factor. That is, the lens group 34 provides a vertical expansion and/or a horizontal compression to the image before it is distorted by the distortion optics 32. The lens group 36 provides a vertical compression and/or a horizontal expansion of the image after it has been distorted by the distortion optics 32. The effect of the lens group 36 is to cancel the effect of the lens group 34 on the image. However, in performing that cancellation, all lines in the image after it has been distorted by the distortion optics 32 which are not entirely vertical or horizontal will be angularly rotated. The resulting visual effect is that of altering the apparent perspective of the image through a greater lateral extent.

The lens group 34 includes a combination of lenses illustrated diagrammatically by a single lens 38 which performs a horizontal compression on the image. The lens group 34 also includes a lens combination diagrammatically illustrated by a single lens 40 which performs a vertical expansion on the image. The lens group 36 includes a lens combination represented diagrammatically by the single lens 42 which performs a horizontal expansion on the image. The lens group 36 also includes a lens combination represented by the single lens 44 which produces a vertical compression on the image. Although the invention is illustrated as including both vertical and horizontal transformation elements, it is to be understood that the invention may be practiced with only horizontal transformation elements 38 and 42, only vertical transformation elements 40 and 44, or a combination of both horizontal and vertical transformation elements as illustrated in FIG. 3.

As previously mentioned, the lenses 38, 40, 42 and 44 are represented as single lenses, but it is to be understood that in actual practice each will comprise a combination of lenses which perform the above-mentioned functions. The transformations on the image produced by the lens groups 34 and 36 can be more fully appreciated from the geometrical diagrams illustrated in FIGS. 4a—e. As shown therein, the image of a scene recorded on the film 28 produced at the object plane of the lens group 34 is illustrated in FIG. 4a. The image is undistorted and is bounded by a frame 46 which is shown as being rectangular. Because of the distortion which will be produced on the image illustrated in FIG. 4a, only that portion of the image within a window 48 will be displayed.

The image at the object plane of the lens group 34 is compressed horizontally by the lens 38 and expanded vertically by the lens 40 to produce an image at the object plane of the distortion optics 32, which image is illustrated in FIG. 4c. Assuming that the distortion optics 32 produces only a shearing effect on the image, the image illustrated in FIG. 4d will be produced at the object plane of the lens group 36. As shown in FIG. 4d, all vertical lines in the image are rotated through an angle a and all horizontal lines remain horizontal.

The lens 42 expands the image horizontally and the lens 44 contracts the image vertically to produce the image illustrated in FIG. 4e. As a result of the various transformations, all vertical lines in the original image illustrated in FIG. 4a are rotated through an angle b and all horizontal lines remain horizontal in the resultant image illustrated in FIG. 4e.

If the lens groups 34 and 36 are removed and the image illustrated in FIG. 4a is produced at the object plane of the distortion optics 32, the image illustrated in FIG. 4b will be produced at the image plane of the distortion optics 32. As shown therein, all vertical lines of the original image will be rotated through the angle a and all horizontal lines will remain horizontal. As shown in FIG. 2, the effect of the transformations produced by the lens groups 34 and 36 is that of expanding the envelope 10, which expanded envelope is designated with the reference numeral 50. The images represented by the parallelograms 22, 24, and 26, therefore, can be realized or produced well within the envelope 50. Consequently, the images which can be produced at the maximum lateral excursions within the envelope 50 are represented by the parallelograms 52 and 54. The image produced by a maximum lateral excursion through the recorded flight path is represented by the parallelogram 56.

If the original image illustrated in FIG. 4a has dimensions $x$ and $y$, the magnification of the lens 38 is $1/m_1$ and the magnification of the lens 40 is $m_2$, the image illustrated in 4c will have the dimensions $x/m_1$ and $m_2y$. If the magnification of the lens 42 is equal to $m_1$ and the magnification of the lens 44 is $1/m_2$ the edges of the image illustrated in FIG. 4e will be spaced the distances $x$ and $y$ from one another.

The angle $b$ can be found by considering the transformations produced by lenses 42 and 44 individually. The lens 42 provides a primitive transformation on the image, with all dimensions along a horizontal axis being multiplied by the factor $m_1$, and with all dimensions along the vertical axis remaining unchanged. Consequently, a vertical line in the original image which has been rotated through the angle $a$ in the intermediate image illustrated in FIG. 4d will be rotated through an angle $(c-a)$ by the lens 42, wherein the angle $c$ represents the total rotation of the line from the vertical. The angle $c$ is defined by the expression:

$$\tan c = m_1 \tan a \quad (1)$$

The lens 44 provides a primitive transformation on the image, with all dimensions along a vertical axis being multiplied by the factor $1/m_2$, and with all dimensions along a horizontal axis remaining unchanged. Consequently, a vertical line in the original image which has been rotated through the angle $a$ in the intermediate image illustrated in FIG. 4d and through the angle $(c-a)$ by the lens 42 will be rotated through a further angle $(b-c)$. The angle $b$ is defined by the expression:

$$\tan b = m_2 \tan c \quad (2)$$

from which:

$$\tan b = m_1 m_2 \tan a \quad (3)$$

The lateral deviation within the envelope of a visual system is proportional to the tangent of the shear angle. Consequently, all of the points around the periphery of the envelope 10 are spaced from a vertical line through the center of the envelope a distance which is proportional to the tangent of the angle $a$. Similarly, all points around the periphery of the envelope 50 are spaced from a vertical center line a distance proportional to the tangent of the angle $b$. Considering expression 3, it is obvious that all points on the envelope 10 have been expanded horizontally a distance equal to the product of the magnifications of $m_1$ and $m_2$. Therefore, if the quantities $m_1$ and $m_2$ are equal to two, their product will be equal to four and the major axis of the envelope 50 will be four times greater than the diameter of the envelope 10.

If the optical system illustrated in FIG. 3 is employed with the visual system disclosed in the aforementioned patent, extremely large lateral excursions can be achieved. For example, if the magnifications of each of the lenses 38, 40, 42 and 44 are equal to two and the magnifications of the primitive transformation elements employed in that visual system are equal to two, a maximum lateral excursion equal to fifteen times the altitude of the recorded flight path can be achieved. Furthermore, such parameters permit a lateral excursion through the recorded flight path of 12 times the altitude of the recorded flight path. These lateral excursion capabilities can only be achieved with the visual system disclosed in the aforementioned patent if the magnifications of the primitive transformation elements thereof are increased considerably. Specifically, a maximum lateral excursion equal to 15 times the altitude of the recorded flight path can only be achieved by such a visual system if the magnifications of the primitive transformation elements therein are increased to approximately four. A lateral excursion through the original flight path of 12 times the altitude of the recorded flight path can only be achieved by such a visual system if the magnifications of the primitive transformation elements employed therein are increased to greater than six. If the primitive transformation magnification is equal to four in the visual system disclosed in the aforementioned patent, a variable spherical magnification element must be employed having a magnification range equal to 16; and if the primitive transformation magnification of such a visual system is equal to six, a variable spherical magnification element must be employed having a magnification range equal to 36. It can be readily appreciated that the visual system of the aforementioned patent would not be practical if it was necessary to employ primitive transformation elements therein having a magnification equal to or greater than four.

The present invention can also be practiced by printing the film 28 through an anamorphic printer which increases the ratio of height to width of the image. The distorted image recorded on the film is then projected through a perspective alteration system, such as that disclosed in the aforementioned patent, and through a lens system, such as the lens group 36, which decreases the ratio of height to width of the image being transformed. In addition, the present invention can be practiced by initially exposing the film 28 with a camera having an anamorphic adapter which increases the ratio of height to width of the image. An image from the resulting developed film can then be transformed by a perspective alteration system and a lens system, such as the lens group 36, to provide an increased lateral excursion capability. Therefore, it can be appreciated that the present invention is not limited to the transformation of images of scenes recorded on a film. In a broad sense, the present invention is a method of altering the apparent perspective of a pattern of optical information bits. If each of the optical information bits is defined as having a finite position with respect to a pair of reference lines orthogonal to one another, such as the edges of an imaginary frame surrounding the optical information bits, then the present invention is practiced by altering the relationship of the distance from one of the reference lines to the distance from the other of the reference lines to each information bit prior to and subsequent to a transformation of the pattern of optical information bits by a perspective alteration system.

Although the invention has been described in conjunction with a visual system disclosed in U.S. Pat. No. 3,015,988, it is to be understood that the optical system of the present invention may be employed with any visual system which alters the apparent perspective of an image. The visual system disclosed in the aforementioned patent employs anamorphic lenses for performing primitive transformations on the image. However, primitive transformations can also be obtained by other techniques, such as a Scheimpflug distortion. Scheimpflug distortion produces a combination of a primitive transformation and a trapezoidal transformation on an image.

The principles of the invention explained in connection with the specific exemplification thereof will suggest many other applications and modifications of the same. It is accordingly desired that, in construing the breadth of the appended claims they shall not be limited to the specific details shown and described in connection with the exemplification thereof.

I claim:

1. In an image alteration system including optical elements movable to variably displace the apparent viewpoint of said image, optical means for increasing the limits within which said apparent viewpoint may be shifted in a plane transverse to the line along which said image is viewed, said optical means comprising:
   a. first means fixedly positioned along the axis of said movable optical elements for altering the position of each optical information bit in said image in a direction parallel to one of a pair of mutually orthogonal reference lines by an amount proportional to the distance from the other of said reference lines; and
   b. second means fixedly positioned along said axis for altering the relationship of the distance from said one reference line to the distance from said other reference line to each information bit by a predetermined factor.

2. The invention according to claim 1 wherein said first and second means are positioned on the same side of said movable optical elements.

3. The invention according to claim 2 wherein said predetermined factor is less than unity.

4. In an image alteration system including optical elements movable to variably displace the apparent viewpoint of said image, optical means for increasing the limits within which said apparent viewpoint may be shifted in a plane transverse to the line along which said image is viewed, said optical means comprising:
   a. first optical means fixedly positioned along the axis of said movable optical elements on one side thereof and effective to alter the ratio of height to width of the image by a first predetermined factor;
   b. second optical means fixedly positioned along said axis on the opposite side of said movable elements from said first optical means and effective to alter the ratio of height to width of the image by a second predetermined factor.

5. The invention according to claim 4 wherein said first factor is equal to the inverse of said second factor.

6. The invention according to claim 4 wherein said first and second optical means each include primitive transformation means.

7. The invention according to claim 4 wherein said first optical means includes a first anamorphic lens having a magnification less than unity along an axis thereof which is parallel to a width dimension of the image and wherein said second optical means includes a second anamorphic lens having a magnification greater than unity along a magnification axis thereof parallel to the width dimension of the image.

8. The invention according to claim 4 wherein said first optical means includes a first anamorphic lens having a magnification greater than unity along a power axis thereof parallel to a height dimension of the image, and wherein said second optical means includes a second anamorphic lens having a magnification less than unity along a power axis thereof parallel to the height dimension of the image.

9. The invention according to claim 4 wherein said first optical means includes a first anamorphic lens having a magnification less than unity along a power axis thereof parallel to a width dimension of the image and a second anamorphic lens having a magnification greater than unity along a power axis thereof parallel to a height dimension of the image, and wherein said second optical means includes a third anamorphic lens having a magnification greater than unity along a power axis thereof parallel to the width dimension of the image and a fourth anamorphic lens having a magnification less than unity along a power axis thereof parallel to the height dimension of the image.